Patented Feb. 4, 1930

1,745,788

UNITED STATES PATENT OFFICE

CASIMIR FUNK, OF NEW YORK, N. Y.

PROCESS FOR THE ISOLATION OF CERTAIN PHYSIOLOGICALLY-ACTIVE SUBSTANCES

No Drawing. Application filed January 4, 1927, Serial No. 159,018, and in Germany January 15, 1926.

Whereas it is known that various substances form picrates which, however, rarely separate out on account of their solubility, it has now been found that by using salts of picric, picrolonic

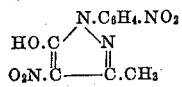

flavianic

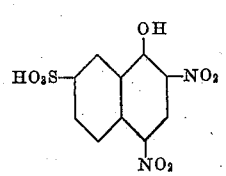

(naphthol-yellow S) and other analogous nitro-, nitrooxy and nitro and nitrooxy sulfoacids characteristic double salts are formed which are insoluble or only slightly soluble. It has been found that most of the substances tested form combinations usually with one salt and not with another, a behavior which greatly assists their separation and identification. The salts which have been used chiefly are the salts of copper, barium, lead, silver and mercury. The procedure is usually carried out as follows:

Aqueous or alcoholic extracts (the latter being evaporated and taken up with water) of various biological materials, such as glands of internal secretion, tissue extracts or extracts containing water soluble vitamines are precipitated as a rule, first with a saturated solution of picric acid, but only in those cases in which picric acid alone does not carry down any of the active material. The filtrate of the picric acid precipitation is then successively treated with the various salts of the above named acids, without taking the excess of the salts out of the solution, and the fractions obtained are tested by the known biological and pharmacological methods.

The new method has been applied, among other, to the purification of insulin, to the preparation of the active substances of posterior lobe of the pituitary, to the preparation of the active substances of the ovary and for the preparation of the vitamines B (antiberiberi), D (yeast growth promoting) and C (antiscorbutic). The process used may be best described by the following examples.

Example 1. Purification of insulin 100 mg. of insulin hydrochloride of very small activity were dissolved in 50 cc. of water and precipitated with a solution of barium picrate. The precipitate formed was centrifuged off, stirred up with water and centrifuged as long as the aqueous extract continued to contain some soluble material; in this way the bulk of impurities was eliminated in form of water soluble barium salts. The yield of the purified insulin amounted to 55 mg. and whereas the activity of the crude product could not be ascertained on account of irregularity of action on rabbits (in vicinity of 0.45 mg. per clinical unit), the activity of the purified material was in the vicinity of 0.1 mg. per clinical unit.

Example 2. Preparation of the hormone of the posterior lobe of the pituitary gland From 270 pituitary glands from the ox 60 gr. of the posterior lobe were secured. The material was extracted with diluted alcohol. After evaporation of the solvent and elimination of the lipin material the aqueous extract was precipitated with a solution of silver picrate. The precipitate amounted to ca. 150 mg. and yielded after elimination of silver and picric acid a crystalline material, which represented the totality of the active material of the posterior portion of the gland.

Example 3. Preparation of vitamines B and D 4 kgr. of rice polishings were extracted with water and the aqueous extract after evaporation was purified by precipitation with a solution of neutral lead acetate. After the elimination of lead the extract was concentrated in vacuum and precipitated with picric acid. The filtrate which contained the totality of the active material was treated first with barium picrate, which was found not to carry down any of the active material, and then either with silver picrate, or with mercury picrate, or with both salts combined. On decomposing latter salts almost the total amount of vitamine B can be obtained. Thus it has been found that silver picrate precipitates about 60% of vitamine B, mercuric picrate—80%, silver flavianate—70%, mercury flavianate—90%, whereas the silver picrolonate only 20% and barium and lead picrate none. Most of the vitamine D was found in the mercury picrate precipitate. Same results were obtained with yeast.

*Example 4. The preparation of the antiscorbutic vitamine (vitamine C)*

From 45 lemons the juice which amounted to about 1 liter has been extracted and the juice precipitated first with a solution of neutral lead acetate and then the active material with basic lead acetate. After the decomposition of the latter lead salt the filtrate was evaporated in vacuum and the residue was precipitated with silver picrate. The silver salt which amounted to about 1 gr. yielded on decomposition the total vitamine C present in this fraction.

It will thus be seen that the present invention comprises the use of salts of salt-forming aromatic nitro compounds in the separation and purification of physiologically and pharmacologically active biological materials, such as hormones and vitamines; that salts of aromatic nitro-phenols, nitro-sulfonic acids and nitrophenol-sulfonic acids are of particular value; and that the heavy metal salts of these aromatic nitro compounds are of particular interest.

I claim:

1. In the separation and purification of physiologically and pharmacologically active biological materials the use of salts of salt-forming aromatic nitro compounds as selective precipitants of said materials and associated impurities.

2. In the separation and purification of hormones and vitamines, the use of heavy metal salts of salt-forming aromatic nitro compounds as selective precipitants of said hormones and vitamines and associated impurities.

3. In the separation and purification of water soluble vitamines, the use of heavy metal salts of salt-forming aromatic nitro compounds as selective precipitants of said vitamines and associated impurities.

4. In the separation and purification of antiscorbutic vitamine, the use of heavy metal salts of salt-forming aromatic nitro compounds as selective precipitant of said vitamine and associated impurities.

5. A process of separating and purifying antiscorbutic vitamine which comprises treating lemon juice with neutral lead acetate and separating the precipitate, and thereafter treating the solution with basic lead acetate and separating the precipitate, decomposing the last mentioned precipitate and finally precipitating the solution thus obtained with silver picrate.

6. In the separation and purification of physiologically and pharmacologically active biological materials the use of salts of salt-forming aromatic nitro-hydroxy compounds as selective precipitants of said materials and associated impurities.

In testimony whereof, I affix my signature.

CASIMIR FUNK.